United States Patent
Kobayashi et al.

(10) Patent No.: US 8,078,419 B2
(45) Date of Patent: Dec. 13, 2011

(54) POLISHING MONITORING METHOD AND POLISHING APPARATUS

(75) Inventors: Yoichi Kobayashi, Tokyo (JP); Taro Takahashi, Tokyo (JP); Yasumasa Hiroo, Tokyo (JP); Akihiko Ogawa, Tokyo (JP); Shinrou Ohta, Tokyo (JP)

(73) Assignee: Ebara Corporation, Tokyo (JP)

( * ) Notice: Subject to any disclaimer, the term of this patent is extended or adjusted under 35 U.S.C. 154(b) by 547 days.

(21) Appl. No.: 12/285,604

(22) Filed: Oct. 9, 2008

(65) Prior Publication Data

US 2009/0104847 A1 Apr. 23, 2009

(30) Foreign Application Priority Data

Oct. 18, 2007 (JP) ................. 2007-271226

(51) Int. Cl.
*G06F 19/00* (2006.01)
*B24B 49/00* (2006.01)
*G01B 7/06* (2006.01)
*G01B 5/02* (2006.01)
*G01R 19/00* (2006.01)
*G01C 17/38* (2006.01)

(52) U.S. Cl. .............. 702/64; 451/5; 451/8; 324/230; 702/97; 702/170; 700/164

(58) Field of Classification Search ............... 700/164; 451/5, 8; 324/230; 702/64, 97, 170
See application file for complete search history.

(56) References Cited

U.S. PATENT DOCUMENTS

| | | | |
|---|---|---|---|
| 6,707,540 B1 | 3/2004 | Lehman et al. | |
| 7,016,795 B2 * | 3/2006 | Swedek et al. | 702/64 |
| 7,175,505 B1 * | 2/2007 | Ko et al. | 451/5 |
| 7,198,545 B1 * | 4/2007 | Korovin et al. | 451/5 |
| 7,264,537 B1 * | 9/2007 | Laursen et al. | 451/8 |
| 2004/0002171 A1 * | 1/2004 | Gotkis et al. | 438/5 |
| 2005/0194971 A1 * | 9/2005 | Lehman et al. | 324/230 |
| 2007/0103150 A1 | 5/2007 | Tada et al. | |
| 2007/0243795 A1 | 10/2007 | Kobayashi et al. | |

FOREIGN PATENT DOCUMENTS

JP 2005-121616 5/2005

* cited by examiner

*Primary Examiner* — Albert Decady
*Assistant Examiner* — Darrin Dunn
(74) *Attorney, Agent, or Firm* — Wenderoth, Lind & Ponack, L.L.P.

(57) ABSTRACT

A method monitors a change in film thickness during polishing using an eddy current sensor. This method includes acquiring an output signal of the eddy current sensor as a correction signal value during water-polishing of a substrate, during dressing of the polishing pad, or during replacement of the polishing pad, calculating a correcting amount from a difference between the correction signal value and a predetermined correction reference value, calculating an actual measurement signal value by subtracting the correction amount from the output signal of the eddy current sensor when polishing a substrate having a conductive film, and monitoring a change in thickness of the conductive film during polishing by monitoring a change in the actual measurement signal value.

5 Claims, 17 Drawing Sheets

US 8,078,419 B2

POLISHING MONITORING METHOD AND POLISHING APPARATUS

BACKGROUND OF THE INVENTION

1. Field of the Invention

The present invention relates to a method of monitoring a change in thickness of a conductive film formed on a surface of a substrate during polishing and also relates to a polishing apparatus.

2. Description of the Related Art

A polishing apparatus is widely used for polishing a conductive film, such as a barrier film and an interconnect metal film, formed on a surface of a wafer. Polishing end point detection and a change in polishing conditions during polishing are determined based on a thickness of the conductive film. Thus, the polishing apparatus usually includes a film-thickness detector for detecting a thickness of the conductive film during polishing. A typical example of this film-thickness detector is an eddy current sensor. This eddy current sensor is configured to supply a high-frequency alternating current to a coil so as to induce an eddy current in the conductive film to thereby detect the thickness of the conductive film from a change in impedance caused by a magnetic field of the eddy current induced.

FIG. 1 is a view showing an equivalent circuit for explaining a principle of the eddy current sensor. When an AC power supply sends a high-frequency alternating current $I_1$ to a coil 1, magnetic lines of force, induced in the coil 1, pass through the conductive film. As a result, mutual inductance occurs between a sensor-side circuit and a conductive-film-side circuit, and an eddy current $I_2$ flows through the conductive film. This eddy current $I_2$ creates magnetic lines of force, which cause a change in an impedance of the sensor-side circuit. The eddy current sensor measures the thickness of the conductive film from the change in the impedance of the sensor-side circuit.

In the sensor-side circuit and the conductive film-side circuit in FIG. 1, the following equations hold.

$$R_1 I_1 + L_1 dI_1/dt + M dI_2/dt = E \quad (1)$$

$$R_2 I_2 + L_2 dI_2/dt + M dI_1/dt = 0 \quad (2)$$

where M represents mutual inductance, $R_1$ represents equivalent resistance of the sensor-side circuit including the coil 1, $L_1$ represents self inductance of the sensor-side circuit including the coil 1, $R_2$ represents equivalent resistance corresponding to eddy current loss, and $L_2$ represents self inductance of the conductive film through which the eddy current flows.

Letting $I_n = A_n e^{j\omega t}$ (sine wave), the above equations (1) and (2) are expressed as follows.

$$(R_1 + j\omega L_1)I_1 + j\omega M I_2 = E \quad (3)$$

$$(R_2 + j\omega L_2)I_2 + j\omega M I_1 = E \quad (4)$$

From these equations (3) and (4), the following equations are derived.

$$I_1 = E(R_2 + j\omega L_2) / [(R_1 + j\omega L_1)(R_2 + j\omega L_2) + \omega^2 M^2] \quad (5)$$

$$= E / [(R_1 + j\omega L_1) + \omega^2 M^2 / (R_2 + j\omega L_2)]$$

Thus, the impedance $\Phi$ of the sensor-side circuit is given by the following equation.

$$\Phi = E/I_1 \quad (6)$$

$$= [R_1 + \omega^2 M^2 R_2 / (R_2^2 + \omega^2 L_2^2)] +$$

$$j\omega[L_1 - \omega^2 L_2 M^2 / (R_2^2 + \omega^2 L_2^2)]$$

Substituting X and Y respectively for a real part (i.e., a resistance component) and an imaginary part (i.e., an inductive reactance component) of the impedance $\Phi$, the above equation (6) is expressed as follows.

$$\Phi = X + j\omega Y \quad (7)$$

FIG. 2 is a view showing a graph drawn by plotting X and Y, which change with a polishing time, on a XY coordinate system. The coordinate system shown in FIG. 2 is defined by a vertical axis as a Y-axis and a horizontal axis X-axis. Coordinates of a point T∞ are values of X and Y when a thickness of a film is zero, i.e., $R_2$ is infinity. Where electrical conductivity of a substrate can be neglected, coordinates of a point T0 are values of X and Y when the thickness of the film is zero, i.e., $R_2$ is infinity. A point Tn, specified by the values of X and Y, travels in an arc toward the point T0 as the thickness of the film decreases. A symbol k in FIG. 2 represents coupling coefficient, and the following relationship holds.

$$M = k(L_1 L_2)^{1/2} \quad (8)$$

FIG. 3 shows a graph obtained by rotating the graph in FIG. 2 through 90 degrees in a counterclockwise direction and further translating the resulting graph. Specifically, the point specified by the coordinates (X, Y) is rotated about the origin O in the XY coordinate system, and the rotated coordinates are further moved so as to create a graph in which a distance between the origin O and the point specified by the coordinates (X, Y) decreases in accordance with an decrease in thickness of the film. A further process, such as amplification, may be applied to the graph in FIG. 3. Although FIG. 3 shows the case where the graph in FIG. 2 is rotated through 90 degrees in the counterclockwise direction, the rotation angle is not limited to 90 degrees. For example, the rotation angle can be adjusted such that the Y-coordinate corresponding to an upper limit of the film thickness to be monitored is equal to the Y-coordinate of the point where the film thickness is zero.

As shown in FIG. 3, the point Tn, positioned from the values of X and Y, travels in an arc toward the point T0, as the thickness of the film decreases. During traveling, a distance Z $(=(X^2+Y^2)^{1/2})$ between the origin O in the X-Y coordinate system and the point Tn decreases as the thickness of the film decreases, as long as the point Tn is not positioned near the point T∞. Therefore, by monitoring the distance Z, a change in thickness of the film during polishing and a polishing end point can be determined. FIG. 4 shows a graph created by plotting the distance Z on the vertical axis and a polishing time on the horizontal axis. As shown in this graph, the distance Z decreases with the polishing time, and becomes constant at a certain time point. Thus, by detecting such a singular point of the distance Z, the polishing end point can be determined.

However, values of an output signal of the eddy current sensor could be drifted (i.e., moved parallel to each other), as shown by a dotted line in FIG. 5, due to a change in operating environments including an ambient temperature around the eddy current sensor and liquid permeation into a polishing pad, and due to a change in condition of the eddy current sensor itself with time. Drift of the values of the output signal of the eddy current sensor results in a change in distance Z from the origin O and an upward displacement of the graph itself, as shown in FIG. 6. Even in this case, it is possible to detect the polishing end point since the singular point is drifted as well. However, this output drift leads to problems when stopping polishing or when changing the polishing conditions at a time point when a preset target thickness is reached. This is because of a change in relationship between the values of the output signal of the eddy current sensor and the film thickness. This causes an error in detection of the polishing time.

Such drift of the output values of the eddy current sensor also affects other method of monitoring a film thickness, other than the above-described method based on the distance Z. For example, the Japanese laid-open patent application No. 2005-121616 discloses, in FIG. 13 thereof, a method of monitoring a change in film thickness during polishing based on a change in angle (θ) between a reference line passing through a center point (fixed point) and a line connecting a point specified by the output signal (component X, component Y) of the eddy current sensor and the center point. This method has an advantage of accurate monitoring of the change in film thickness regardless of the change in thickness of a polishing pad. However, in this method also, the angle θ could change in accordance with the change with time in output values of the eddy current sensor. As a result, the relationship between the values of the output signal of the eddy current sensor and the film thickness could change.

To solve these problems, it is necessary to calibrate the eddy current sensor regularly. However, in order to calibrate the eddy current sensor, the polishing process should be stopped, and as a result, the availability of the polishing apparatus is lowered. For this reason, in a semiconductor mass production facility, calibration of the eddy current sensor cannot be carried out frequently.

SUMMARY OF THE INVENTION

The present invention has been made in view of the above drawbacks. It is therefore an object of the present invention to provide a polishing monitoring method and a polishing apparatus capable of calibrating the eddy current sensor without lowering the availability of the polishing apparatus and capable of accurately monitoring the film thickness.

One aspect of the present invention for achieving the above object provides a method of monitoring a change in thickness of a conductive film on a substrate brought into sliding contact with a polishing surface of a polishing pad using an eddy current sensor. This method includes acquiring an output signal of the eddy current sensor as a correction signal value during water-polishing of a substrate, during dressing of the polishing pad, or during replacement of the polishing pad, calculating a correcting amount from a difference between the correction signal value and a predetermined correction reference value, calculating an actual measurement signal value by subtracting the correction amount from the output signal of the eddy current sensor when polishing a substrate having a conductive film, and monitoring a change in thickness of the conductive film during polishing by monitoring a change in the actual measurement signal value.

In a preferred aspect of the present invention, the correction reference value comprises an output signal of the eddy current sensor obtained in advance under the same conditions as those when the correction signal value is acquired.

In a preferred aspect of the present invention, the method further includes acquiring a characteristic signal value of the eddy current sensor, acquiring an output signal of the eddy current sensor as an initial signal value under the same conditions as those when the characteristic signal value is acquired, calculating an initial drift from a difference between the characteristic signal value and the initial signal value, and before the calculating of the correcting amount, correcting the correction reference value by subtracting the initial drift from the correction reference value.

In a preferred aspect of the present invention, the output signal of the eddy current sensor comprises a resistance component and an inductive reactance component of an impedance of an electric circuit including a coil of the eddy current sensor.

In a preferred aspect of the present invention, the output signal of the eddy current sensor comprises a resistance component and an inductive reactance component of an impedance of an electric circuit including a coil of the eddy current sensor, the resistance component and the inductive reactance component are defined as coordinates on a coordinate system, and the coordinates are rotated and moved on the coordinate system such that a distance between an origin of the coordinate system and a point specified by the coordinates decreases in accordance with a decrease in the thickness of the conductive film.

Another aspect of the present invention provides a polishing apparatus including a polishing pad having a polishing surface, an eddy current sensor, a top ring configured to press a substrate against the polishing surface, a dresser configured to dress the polishing surface, a mechanism configured to provide relative motion between the substrate and the polishing pad, and a monitoring unit configured to monitor a change in thickness of a conductive film on a substrate brought into sliding contact with the polishing surface using the eddy current sensor. The monitoring unit is operable to acquire an output signal of the eddy current sensor as a correction signal value during water-polishing of a substrate, during dressing of the polishing pad, or during replacement of the polishing pad, calculate a correcting amount from a difference between the correction signal value and a predetermined correction reference value, calculate an actual measurement signal value by subtracting the correction amount from the output signal of the eddy current sensor when polishing a substrate having a conductive film, and monitor a change in thickness of the conductive film during polishing by monitoring a change in the actual measurement signal value.

According to the present invention, the calibration of the eddy current sensor can be performed on software during predetermined processes, such as dressing, which are necessarily performed in the polishing apparatus. Therefore, accurate monitoring of the film thickness can be performed continuously without lowering the availability of the polishing apparatus.

DETAILED DESCRIPTION OF THE PREFERRED EMBODIMENTS

Embodiments of the present invention will be described below with reference to the drawings.

Figure 7:
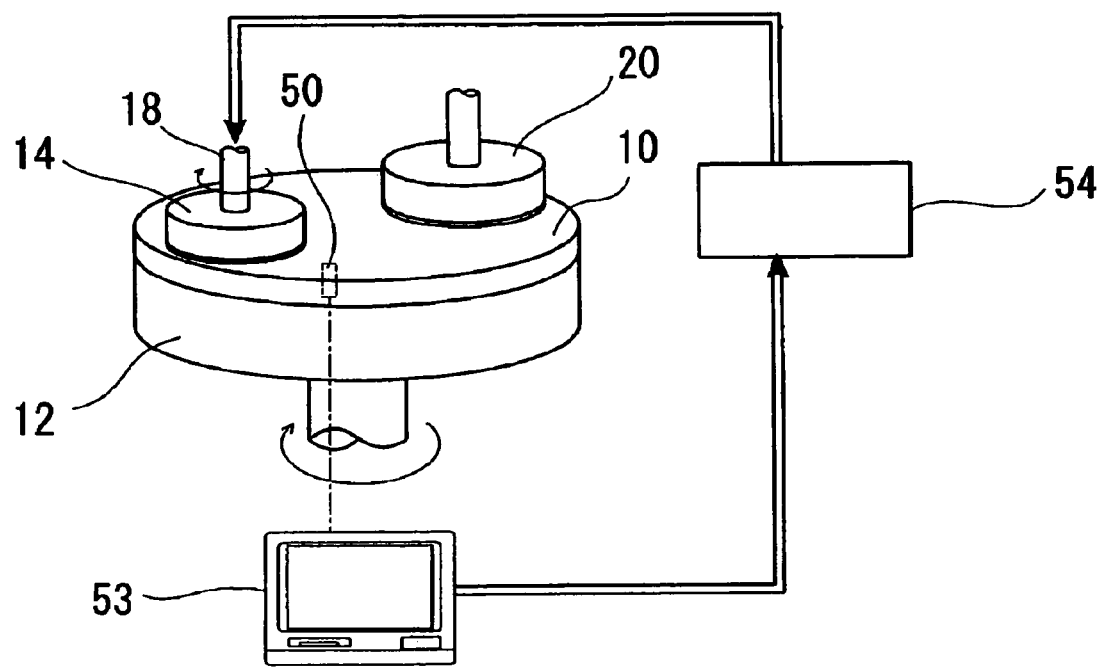
FIG. 7 is a schematic view showing a whole structure of a polishing apparatus according to an embodiment of the present invention.

FIG. 7 is a schematic view showing a whole structure of a polishing apparatus according to an embodiment of the present invention. As shown in FIG. 7, the polishing apparatus has a polishing table 12 holding a polishing pad 10 on an upper surface thereof, a top ring 14 configured to hold a wafer (substrate), which is a workpiece to be polished, and to press the wafer against an upper surface of the polishing pad 10, and a dresser 20 configured to perform dressing (or conditioning) on the upper surface of the polishing pad 10 when polishing of the wafer is not performed. The upper surface of the polishing pad 10 provides a polishing surface used in sliding contact with the wafer.

The polishing table 12 is coupled to a motor (not shown) disposed therebelow, and is rotatable about its own axis as indicated by arrow. A polishing liquid supply nozzle (not shown) is disposed above the polishing table 12, so that a polishing liquid is supplied from the polishing liquid supply nozzle onto the polishing pad 10.

The top ring 14 is coupled to a top ring shaft 18, which is coupled to a motor and an elevating cylinder (not shown). The top ring 14 can thus be vertically moved as indicated by arrow and rotated about the top ring shaft 18. The wafer to be polished is attracted to and held on a lower surface of the top ring 14 by a vacuum attraction or the like.

With the above-described structures, the wafer, held on the lower surface of the top ring 14, is rotated and pressed by the top ring 14 against the polishing surface of the polishing pad 10 on the rotating polishing table 12. The polishing liquid is supplied from the polishing liquid supply nozzle onto the polishing surface of the polishing pad 10. The wafer is thus polished in the presence of the polishing liquid between the surface (lower surface) of the wafer and the polishing pad 10. In this embodiment, the polishing table 12 and the top ring 14 constitute a mechanism of providing relative motion between the wafer and the polishing pad 10.

Figure 8:
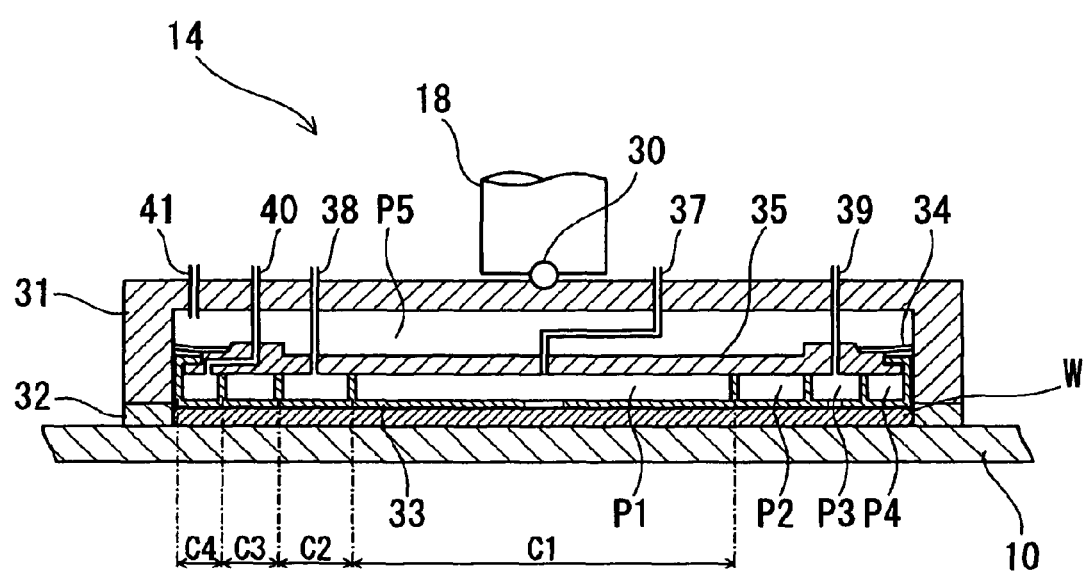
FIG. 8 is a schematic view showing a cross section of a top ring shown in FIG. 7.

FIG. 8 is a schematic view showing a cross section of the top ring shown in FIG. 7. As shown in FIG. 8, the top ring 14 has a disk-like top ring body 31 coupled to a lower end of the top ring shaft 18 via a flexible joint 30, and a retainer ring 32 provided on a lower portion of the top ring body 31. The top ring body 31 is made of a material having high strength and rigidity, such as metal or ceramic. The retainer ring 32 is made of highly rigid resin, ceramic, or the like. The retainer ring 32 may be formed integrally with the top ring body 31.

The top ring body 31 and the retainer ring 32 have therein a space, which accommodates an elastic pad 33 to be brought into contact with the wafer W, an annular pressure sheet 34 made from an elastic membrane, and a disk-shaped chucking plate 35 configured to hold the elastic pad 33. The elastic pad 33 has an upper peripheral edge held by the chucking plate 35. Four pressure chambers (air bags) P1, P2, P3, and P4 are provided between the elastic pad 33 and the chucking plate 35. These pressure chambers P1, P2, P3, and P4 are in fluid communication with a non-illustrated pressure-adjusting device via fluid passages 37, 38, 39, and 40, respectively. The pressure-adjusting device is configured to supply a pressurized fluid (e.g., a pressurized air) into the pressure chambers P1, P2, P3, and P4 and to develop a vacuum in these pressure chambers. The center pressure chamber P1 has a circular shape, and the other pressure chambers P2, P3, and P4 have an annular shape. These pressure chambers P1, P2, P3, and P4 are concentrically arranged. The pressure-adjusting device may comprise a compressor and a vacuum pump.

The pressure-adjusting device can independently change internal pressures of the pressure chambers P1, P2, P3, and P4 to thereby substantially independently adjust pressing forces to be applied to four areas: a central area C1, an inner area C2, an outer area C3, and a peripheral area C4. To be exact, each area is more or less affected by the adjacent area. Further, by elevating or lowering the top ring 14 in its entirety, the retainer ring 32 can exert a predetermined force on the polishing pad 10. A pressure chamber P5 is formed between the chucking plate 35 and the top ring body 31. The above-described pressure-adjusting device is configured to supply a pressurized fluid into the pressure chamber P5 and to develop a vacuum in the pressure chamber P5 via a fluid passage 41. With this operation, the chucking plate 35 and the elastic pad 33 in their entirety are moved vertically. The retainer ring 32 is arranged around the wafer W so as to prevent the wafer W from coming off the top ring 14 during polishing.

Figure 2:
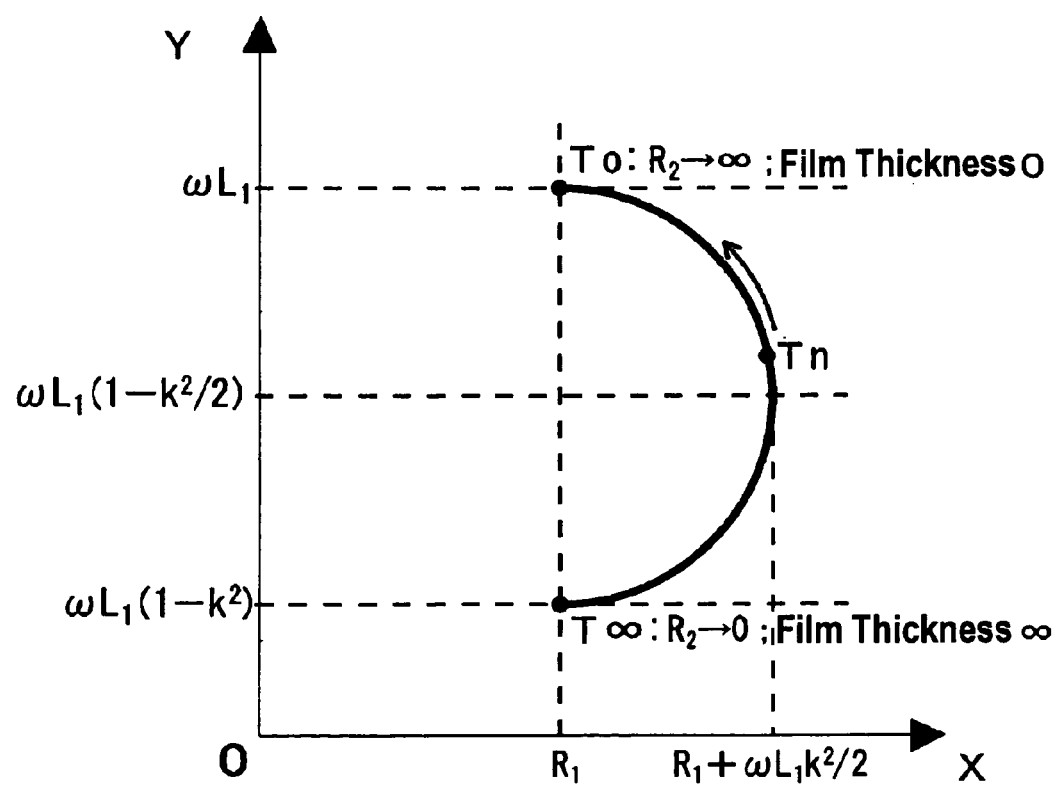
FIG. 2 is a view showing a graph drawn by plotting X and Y, which change with a polishing time, on a XY coordinate system.

As shown in FIG. 7, an eddy current sensor 50 for detecting a thickness of a conductive film formed on the wafer W is provided in the polishing table 12. This eddy current sensor 50 is coupled to a monitoring unit 53, which is couple to a CMP controller 54. Output signals of the eddy current sensor 50 are sent to the monitoring unit 53. This monitoring unit 53 processes the output signals of the eddy current sensor 50, as described with reference to FIGS. 3 and 4, and calculates the distance Z (see FIG. 4) as a monitoring signal that changes in accordance with the thickness of the conductive film. Processing of the output signals of the eddy current sensor 50 by the monitoring unit 53 include the rotating process and the translating process of the graph shown in FIG. 2. The monitoring unit 53 monitors a change in the monitoring signal (i.e., a change in thickness of the conductive film) during polishing in each of the areas C1, C2, C3, and C4.

Figure 9:
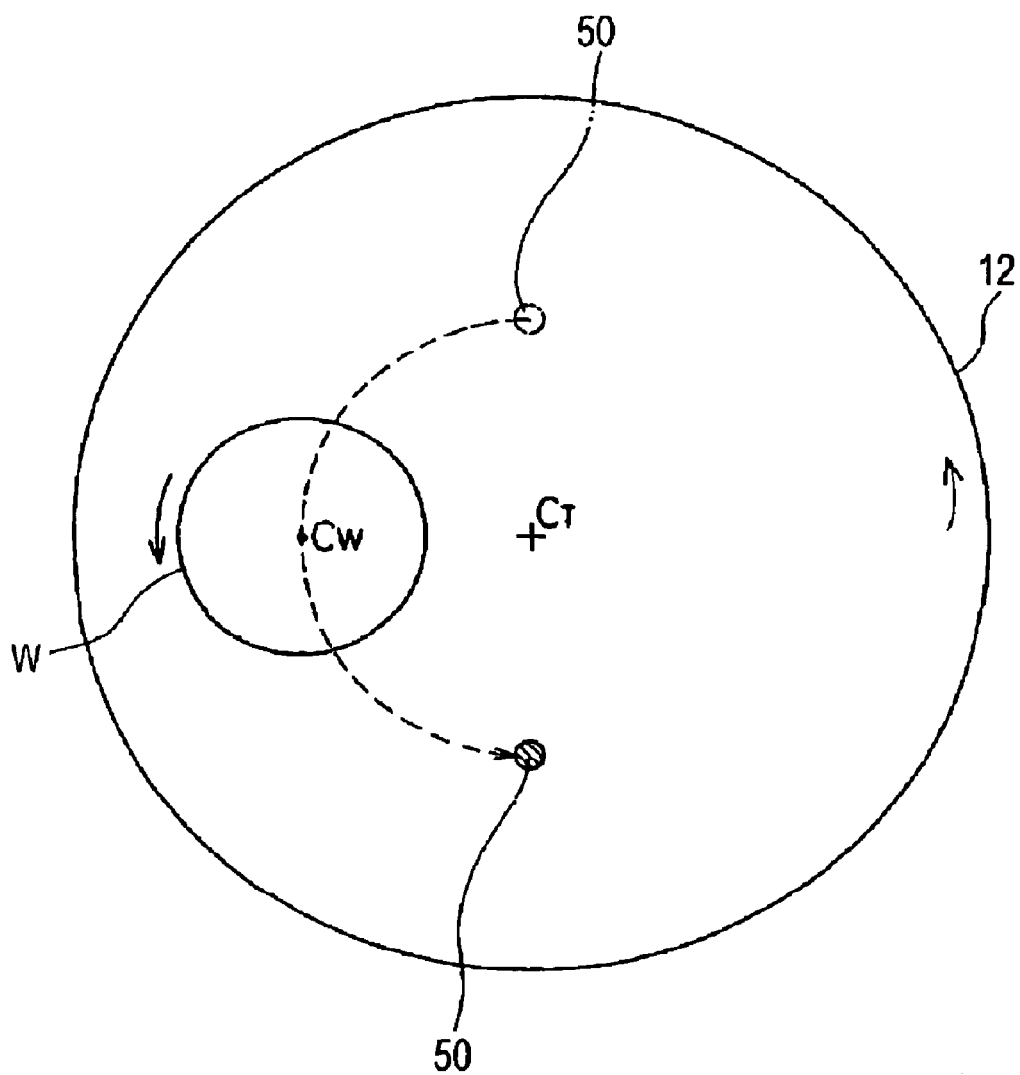
FIG. 9 is a plan view showing a positional relationship between a polishing table and a wafer.

FIG. 9 is a plan view showing a positional relationship between the polishing table 12 and the wafer W. A symbol $C_T$ represents a rotation center of the polishing table 12. As shown in FIG. 9, the eddy current sensor 50 is provided in a position such that the eddy current sensor 50 passes through a center $C_w$ of the wafer W held by the top ring 14 during polishing. Specifically, the eddy current sensor 50 sweeps across the wafer W in a substantially radial direction of the wafer W each time the polishing table 12 makes one revolution.

Figure 10:
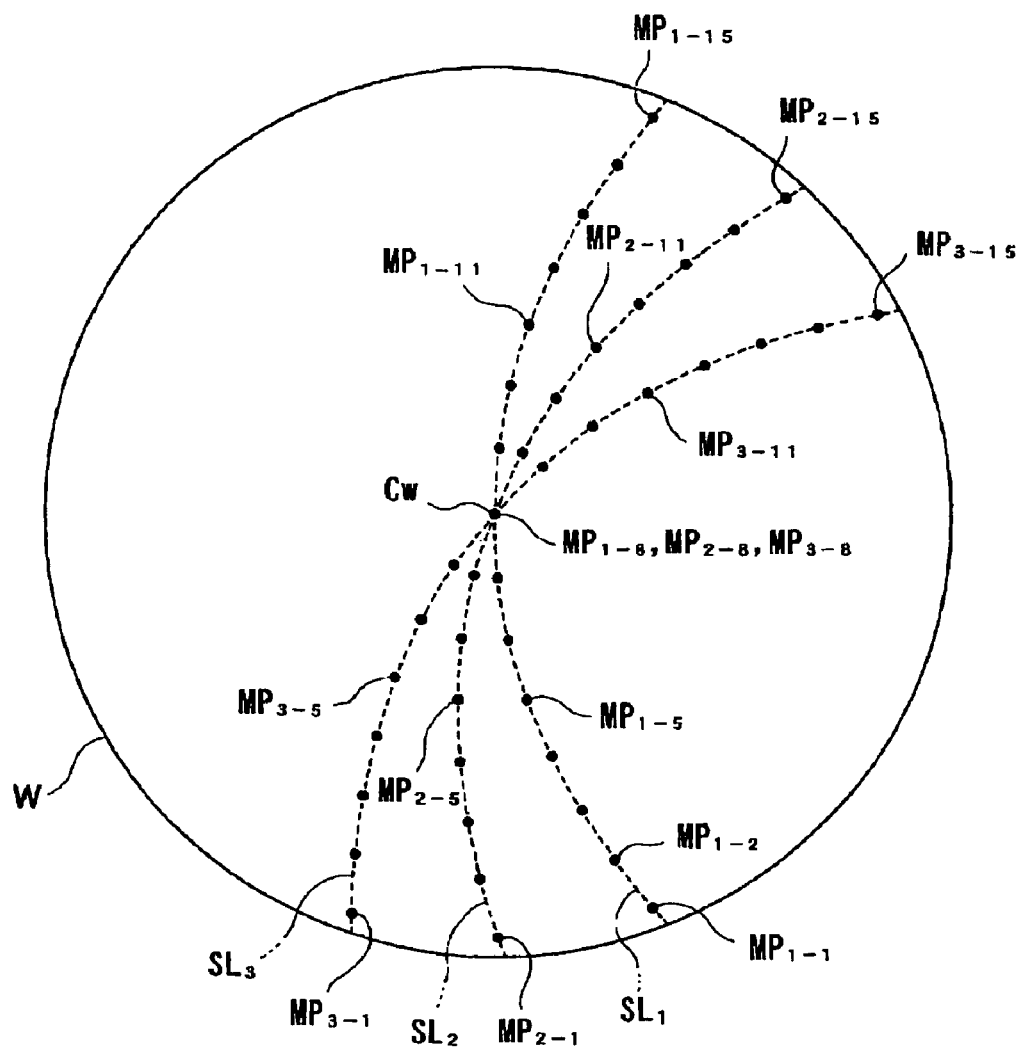
FIG. 10 is a view showing paths of an eddy current sensor sweeping across the wafer.

FIG. 10 is a view showing paths of the eddy current sensor 50 sweeping across the wafer W. As described above, when the polishing table 12 is rotated, the eddy current sensor 50 sweeps across a surface of the wafer W so as to describe a path passing through the center $C_w$ of the wafer W (i.e., the center of the top ring shaft 18). Because a rotational speed of the top ring 14 is generally different from a rotational speed of the polishing table 12, the path of the eddy current sensor 50 on the surface of the wafer W varies every time the polishing table 12 makes rotation, as shown by scan lines (sweep lines) $SL_1$, $SL_2$, $SL_3$, ... in FIG. 10. Even in this case, since the eddy current sensor 50 is located so as to pass through the center $C_w$ of the wafer W as described above, the path of the eddy current sensor 50 passes through the center $C_w$ of the wafer W in every rotation. In this embodiment, timing of film-thickness detection by the eddy current sensor 50 is adjusted so that the film thickness at the center $C_w$ of the wafer W is monitored by the eddy current sensor 50 in every rotation.

It is known that a film-thickness profile of a surface of a polished wafer W is generally axisymmetric with respect to an axis that extends through the center $C_w$ of the wafer W in a direction perpendicular to the surface of wafer W Accordingly, as shown in FIG. 10, when an nth monitoring point on an mth scan line $SL_m$ is represented by $MP_{m-n}$, the change in the film thickness of the wafer W in a radial position of nth monitoring points can be monitored by tracking the monitoring signals of the nth monitoring points $MP_{1-n}$, $MP_{2-n}$, ..., $MP_{m-n}$ on respective scan lines.

Figure 11:
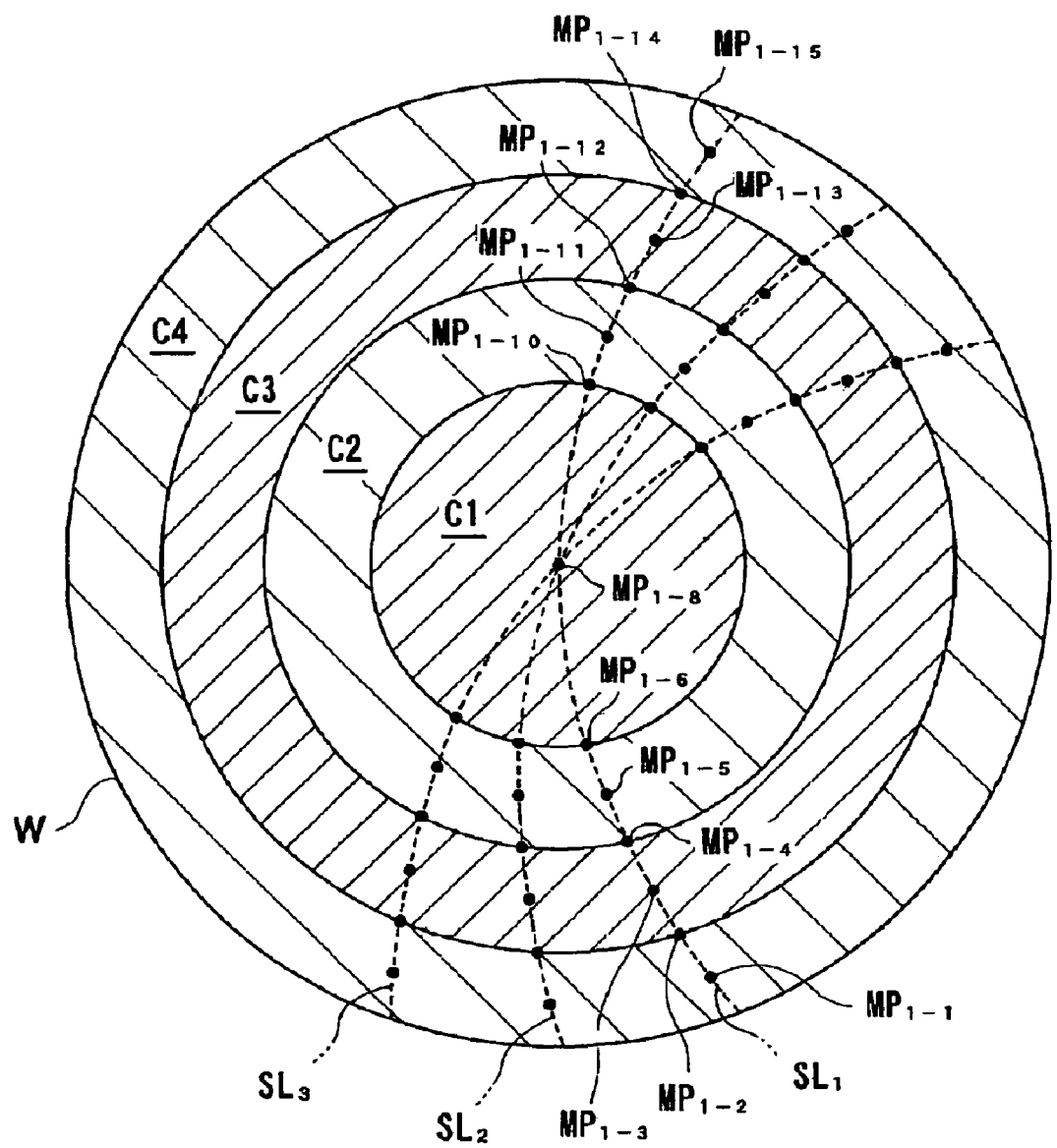
FIG. 11 is a plan view showing an example of selection of monitoring points to be monitored by a monitoring unit, among monitoring points on the wafer shown in FIG. 10.

FIG. 11 is a plan view showing an example of selection of the monitoring points to be monitored by the monitoring unit 53, among the monitoring points on the wafer shown in FIG. 10. In the example shown in FIG. 11, the monitoring unit 53 monitors the monitoring points $MP_{m-1}$, $MP_{m-2}$, $MP_{m-3}$, $MP_{m-4}$, $MP_{m-5}$, $MP_{m-6}$, $MP_{m-8}$, $MP_{m-10}$, $MP_{m-11}$, $MP_{m-12}$, $MP_{m-13}$, $MP_{m-14}$, and $MP_{m-15}$ located near centers and boundaries of the areas C1, C2, C3, and C4. Unlike the example shown in FIG. 10, another monitoring point may be provided between the monitoring points $MP_{m-i}$ and $MP_{m-(i+1)}$. Selection of the monitoring points to be monitored is not limited to the example shown in FIG. 11. Points to be monitored in view of controlling polishing of the surface of the wafer W can be selected as the monitoring points. Alternatively, all of the monitoring points on each scan line can be selected.

In FIG. 10, for the sake of simplification, the number of monitoring points in one scanning operation is 15. However, the number of monitoring points is not limited to the illustrated example and can be various numbers in accordance with a period of measurement and the rotational speed of the polishing table 12. For example, it is possible to set three hundreds of the monitoring points distributed from an end of the wafer W to another, and to divide these monitoring points into four segments corresponding to the areas C1, C2, C3, and C4. In this case, an average value or a representative value of the output signal values of the sensor 50 obtained at the monitoring points in each segment may be calculated, and the average value or the representative value calculated may be used as the output signal value of the sensor 50 in that segment. In order to smooth data to eliminate noises, the output signal values obtained at the neighboring monitoring points may be standardized.

The monitoring unit 53 performs the above-described processes on the output signals of the eddy current sensor 50 obtained at the selected monitoring points to produce the monitoring signal (i.e., the distance Z in this embodiment). The monitoring unit 53 compares the monitoring signal obtained at each selected monitoring point with a reference signal that is preset for each of the pressure chambers P1, P2, P3, and P4, and calculates optimum pressures in the pressure chambers P1, P2, P3, and P4 that can allow the respective monitoring signals to converge to the corresponding reference signal. Thus, the monitoring unit 53 functions as a controller for controlling the internal pressures of the pressure chambers P1, P2, P3, and P4 based on the monitoring signal.

The calculated pressures are sent from the monitoring unit 53 to the CMP controller 54. This CMP controller 54 changes the internal pressures of the pressure chambers P1, P2, P3, and P4 via the pressure-adjusting device. In this manner, the pressing forces applied to the respective areas C1, C2, C3, and C4 in the wafer W are adjusted. The monitoring unit 53 and the CMP controller 54 may be integrated into a single control unit.

Figure 1:
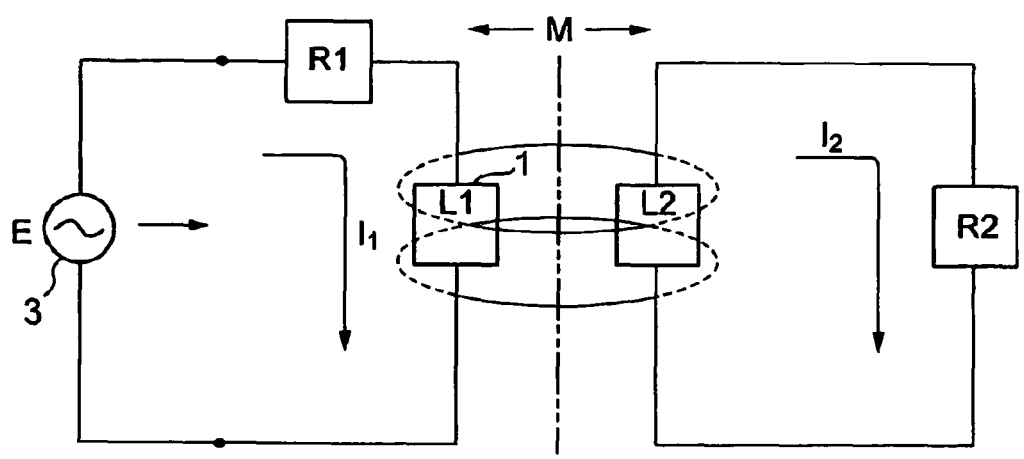
FIG. 1 is a view showing an equivalent circuit for explaining a principle of an eddy current sensor.
Figure 12:
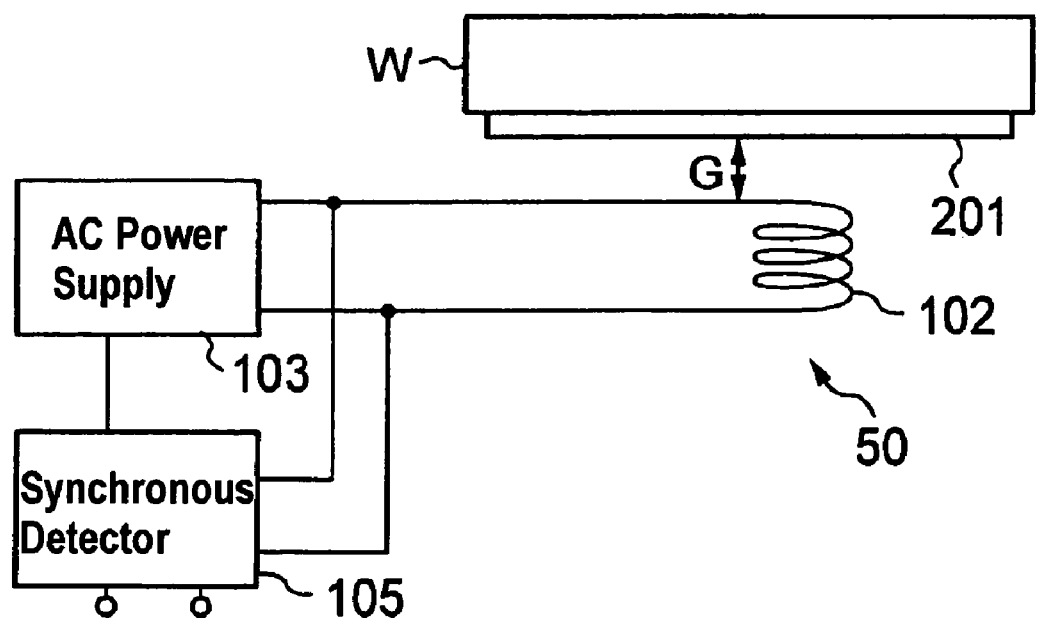
FIG. 12 is a schematic view showing the eddy current sensor.

FIG. 12 is a schematic view showing the eddy current sensor. This eddy current sensor 50 includes a sensor coil 102, an AC power supply 103 connected to the coil 102, and a synchronous detector 105 configured to detect a resistance component X and an inductive reactance component Y of an electric circuit including the sensor coil 102 (the sensor-side circuit in FIG. 1). A conductive film 201, which is a film to be detected in its thickness, is a thin film on the wafer W, and this thin film is made of a conductive material, such as copper, tungsten, tantalum, or titanium. A distance G between the sensor coil 102 and the conductive film is in a range of 0.5 mm to 5 mm, for example.

Figure 13:
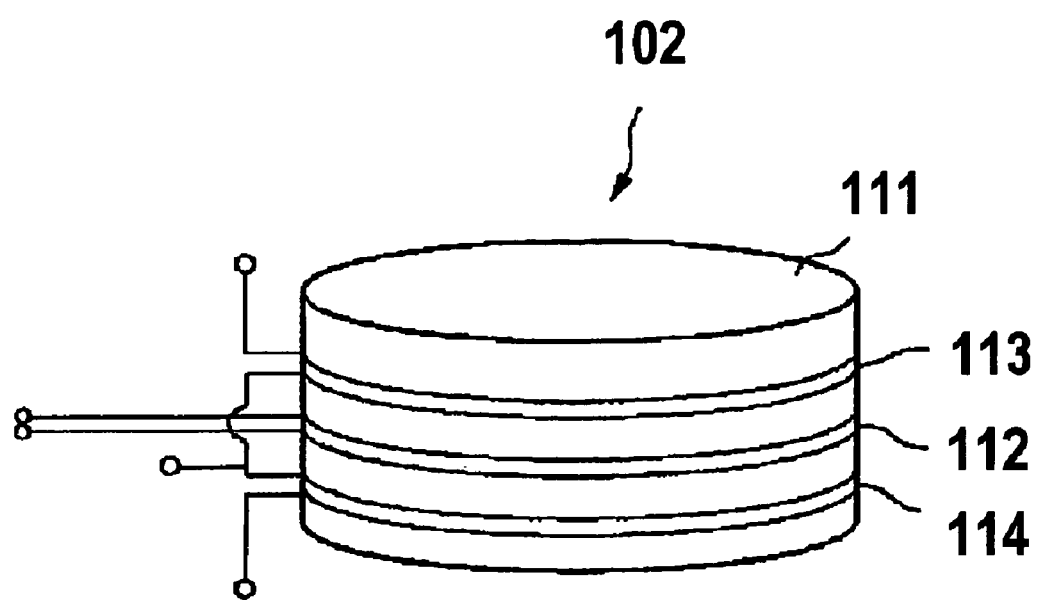
FIG. 13 is a view showing an example of a sensor coil of the eddy current sensor shown in FIG. 12.

FIG. 13 is a view showing an example arrangement of the sensor coil of the eddy current sensor shown in FIG. 12. The sensor coil 102 includes a bobbin 111, and three coils 112, 113, and 114 wound on the bobbin 111. These coils 112, 113, and 114 form a three-layer coil. The center coil 112 is an exciting coil connected to the AC power supply 103. This exciting coil 112 produces a magnetic field with supply of an alternating current from the AC power supply 103 to thereby generate an eddy current in the conductive film on the wafer. The detection coil 113 is located above the exciting coil 112 (i.e., located at the conductive-film side). This detection coil 113 is configured to detect a magnetic flux generated by the eddy current flowing in the conductive film. The balance coil 114 is located at an opposite side of the detection coil 113.

The coils 112, 113, and 114 have the same number of turns (1 to 500 turns). The detection coil 113 and the balance coil 114 are connected in opposite phase to each other. When the conductive film is present near the detection coil 113, the magnetic flux produced by the eddy current flowing through the conductive film is interlinked with the detection coil 113 and the balance coil 114. Since the detection coil 113 is located closer to the conductive film than the other coils, induced voltages produced in the coils 113 and 114 are unbalanced, whereby the interlinkage flux generated by the eddy current in the conductive film can be detected.

Figure 14:
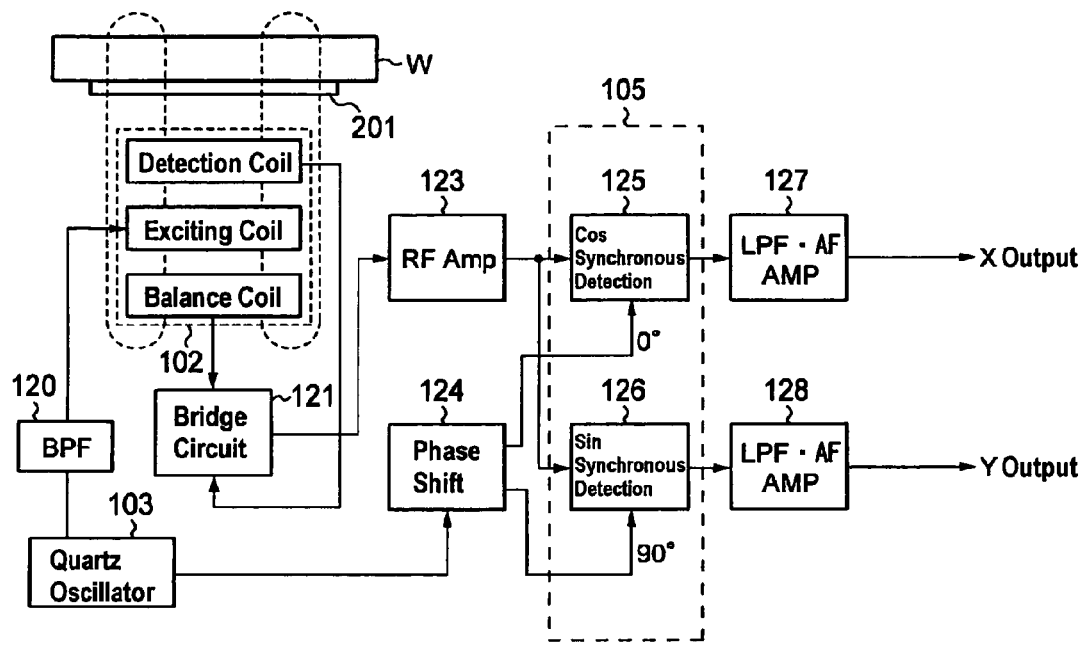
FIG. 14 is a schematic view showing the details of the eddy current sensor.

FIG. 14 is a schematic view showing the details of the eddy current sensor. The AC power supply 103 includes an oscillator, such as a quartz oscillator, generating a fixed frequency. For example, the AC power supply 103 supplies an alternating current having a fixed frequency of 1 to 50 MHz to the sensor coil 102. The alternating current generated by the AC power supply 103 is supplied to the sensor coil 102 via a bandpass filter 120. A terminal of the sensor coil 102 outputs a signal, which is sent to the synchronous detector 105 via a bridge circuit 121 and a high-frequency amplifier 123. The synchronous detector 105 has a cosine synchronous detection circuit 125 and a sine synchronous detection circuit 126, and extracts the resistance component and the inductive reactance component of an impedance.

Low-pass filters 127 and 128 are provided so as to remove unnecessary high-frequency components (e.g., not less than 5 kHz) from the resistance component and the inductive reactance component outputted from the synchronous detector 105. As a result, a signal X as the resistance component and a signal Y as the inductive reactance component of the impedance are outputted from the eddy current sensor 50. The monitoring unit 53 performs the same processes on the output signals X and Y as described with reference to FIG. 3 (e.g., the rotating process and the translating process) to thereby calculate the distance Z (see FIG. 3 and FIG. 4) as the monitoring signal. Processing of the output signals X and Y of the eddy current sensor 50, e.g., the rotating process and the translating process, may be performed electrically in the eddy current sensor 50 or may be performed by the calculation in the monitoring unit 53.

Figure 3:
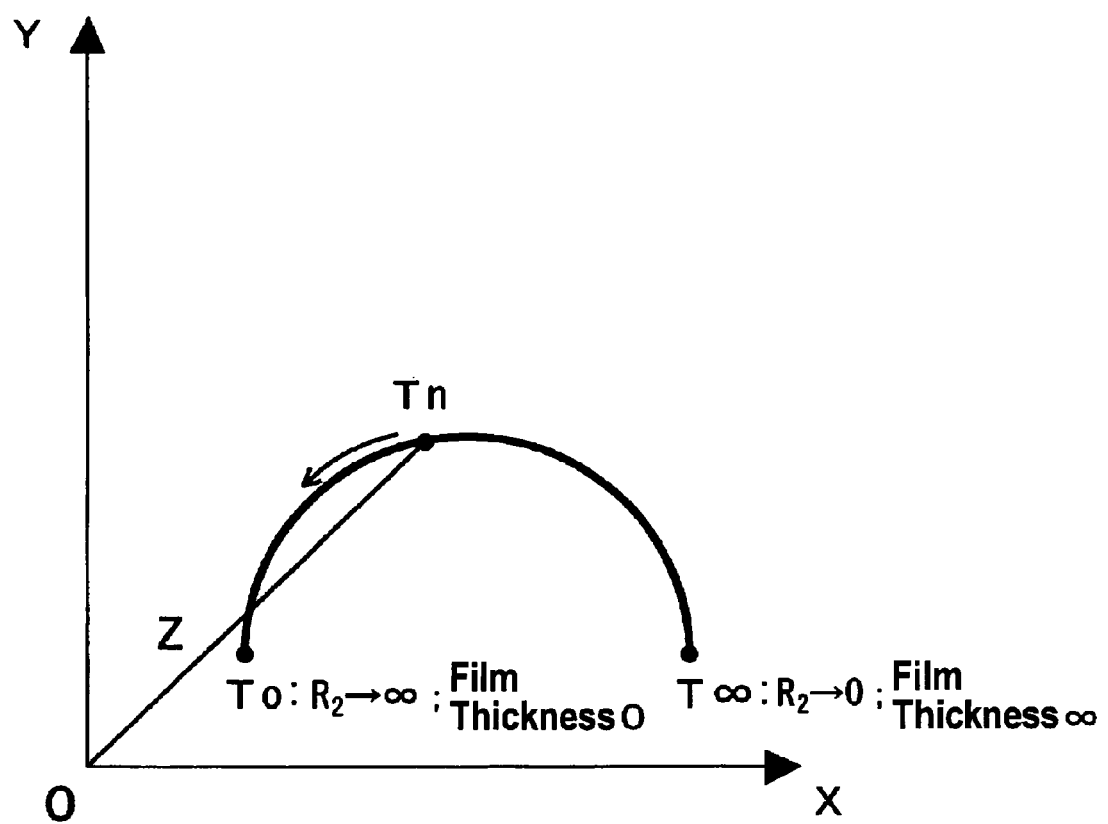
FIG. 3 shows a graph obtained by rotating the graph in FIG. 2 through 90 degrees in a counterclockwise direction and further translating the resulting graph.

Monitoring of the change in the film thickness may be performed without processing of the signals X and Y as described in FIG. 3. In this case, a reference point (fixed point) is provided near the point To in FIG. 2, so that the change in the film thickness is monitored based on a change in distance between the reference point and the point Tn. This reference point is provided in a position (which is specified by coordinates) such that the distance between the reference point and the point Tn decreases with the polishing time.

Figure 5:
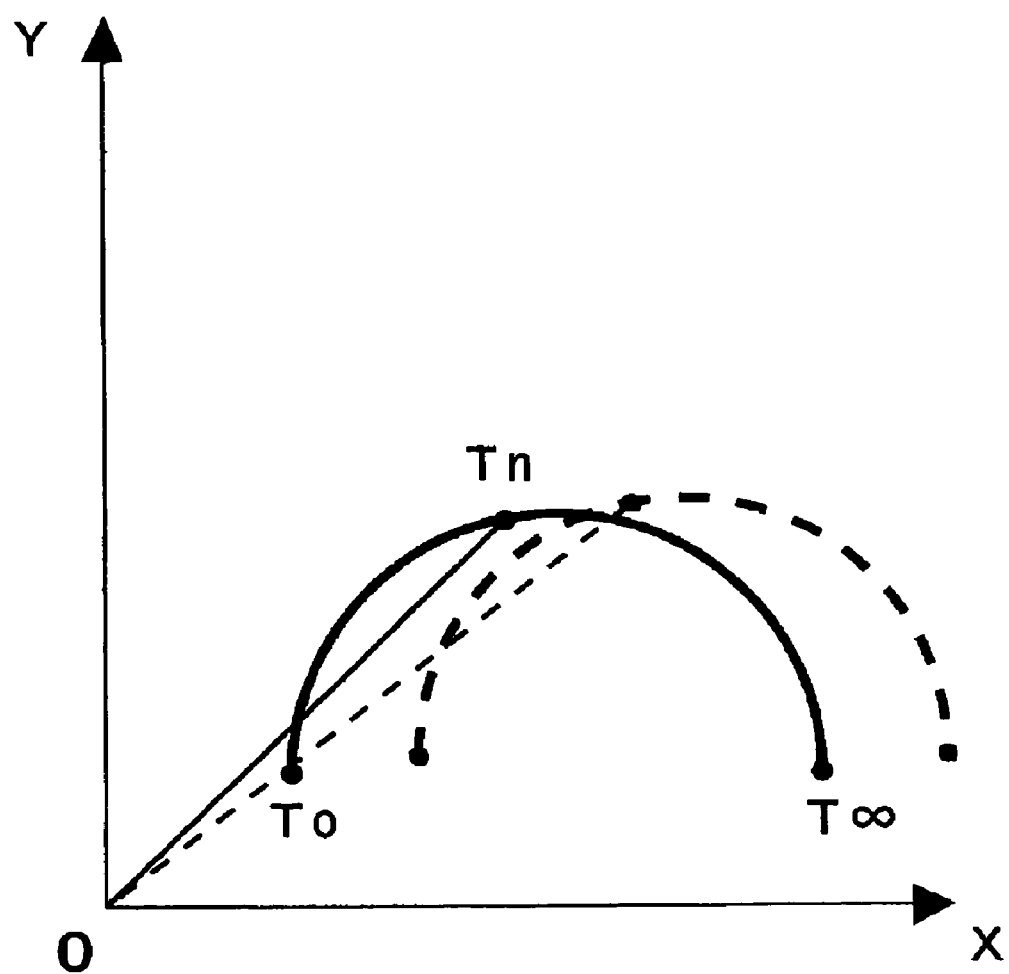
FIG. 5 illustrates drift of output signal values of the eddy current sensor.
Figure 6:
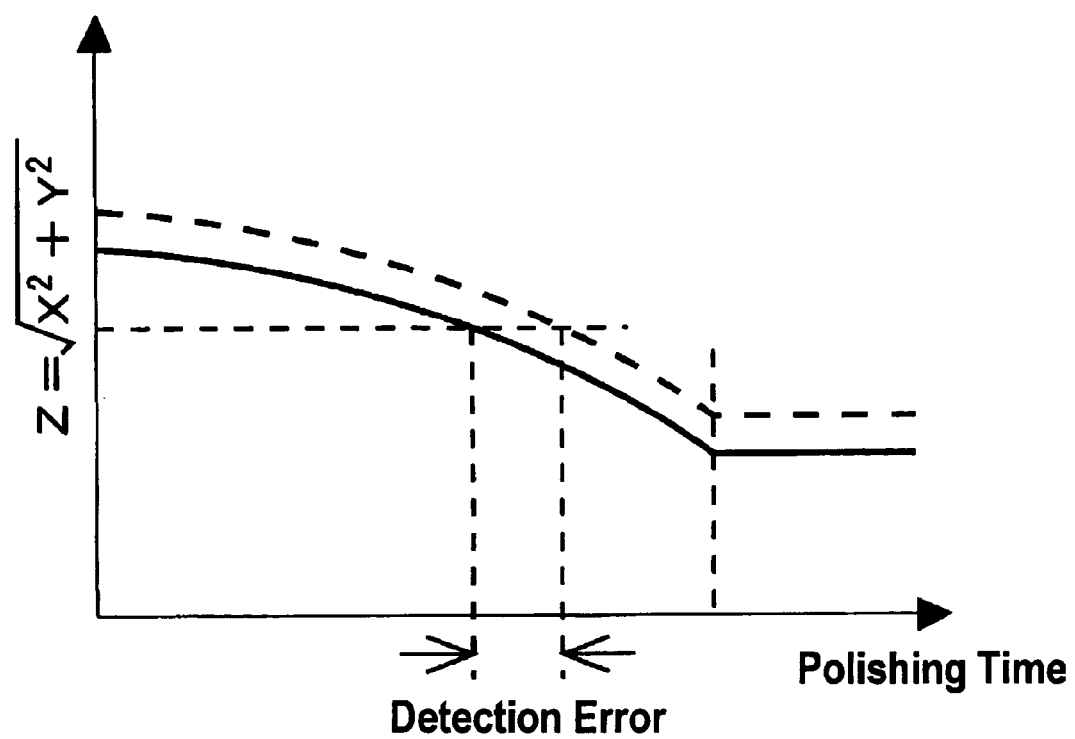
FIG. 6 is a view illustrating a detection error caused by the drift of the output signal values of the eddy current sensor.

The output signal values of the eddy current sensor could be drifted (i.e., moved parallel to each other), as shown in FIG. 5, due to a change in operating environments including an ambient temperature and liquid permeation into the polishing pad and due to a change in condition of the eddy current sensor 50 itself with time. Thus, in this embodiment, the monitoring unit 53 periodically performs calibration of the output signals of the eddy current sensor 50 so as to accurately monitor the change in the film thickness. The following descriptions are about a calibration process to be performed on the output signals which are obtained through the above-mentioned processes as shown in FIG. 3 (e.g., the rotating process, the translating process) performed on the output signals X and Y of the eddy current sensor 50. The calibration process may be performed prior to the above-mentioned processes. In this specification, the output signals of the eddy current sensor 50 include both signals obtained through the above-mentioned processes and raw signals without application of the above-mentioned processes.

Figure 15:
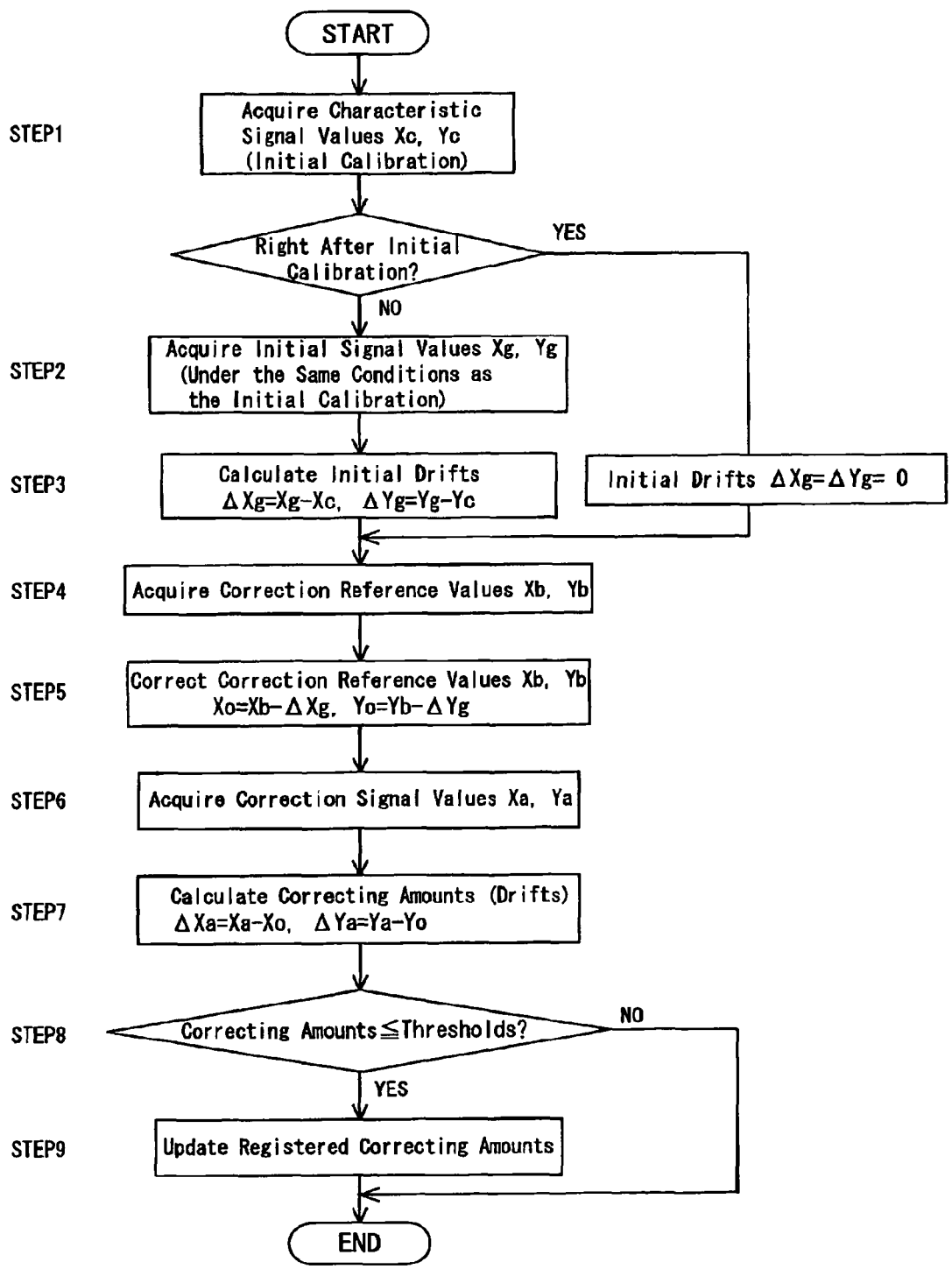
FIG. 15 is a diagram showing a flow chart of calibrating an output signal of the eddy current sensor.
Figure 16:
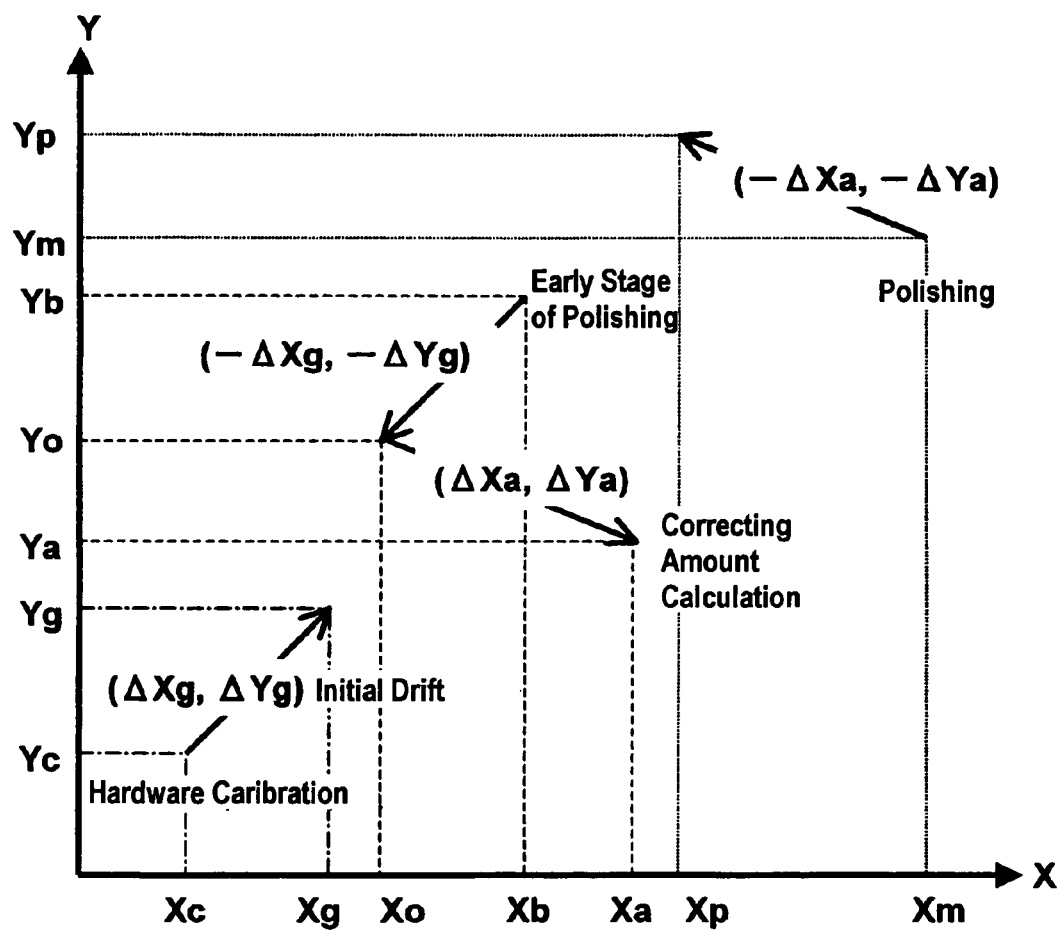
FIG. 16 is a view visually illustrating the process of calibrating the output signal of the eddy current sensor in accordance with the flow chart of FIG. 15.

FIG. 15 is a diagram showing a flow chart of calibration of the output signals of the eddy current sensor, and FIG. 16 is a view visually illustrating the process of calibrating the output signal of the eddy current sensor 50 in accordance with the flow chart of FIG. 15.

As shown in FIG. 15, at step 1, an initial calibration (i.e., a hardware calibration) of the eddy current sensor 50 is performed. Specifically, the polishing pad 10 is removed from the polishing table 12, and a spacer having a predetermined thickness is placed on the upper surface of the polishing table 12. A wafer with no conductive film (i.e., the film thickness is zero) is placed on the spacer. In this state, the monitoring unit 53 acquires characteristic signal values Xc and Yc of the eddy current sensor 50. Then, the output of the eddy current sensor 50 is adjusted so that the characteristic signal values Xc and Yc correspond to predetermined coordinates indicating the film thickness of zero.

In this initial calibration (i.e., the hardware calibration), the output of the eddy current sensor 50 is further adjusted using a wafer with a conductive film having a predetermined thickness so that the output signals of the eddy current sensor 50 correspond to other predetermined coordinates. From the results of these operations, a degree of the amplification and an angle of the rotation as described in connection with FIG. 3 are finally determined. In this manner, the initial calibration (i.e., the hardware calibration) is performed with no polishing pad present above the eddy current sensor 50. The above-described wafer with no conductive film and the wafer with the conductive film are a wafer dedicated to the calibration. Thus, a resistivity of such a wafer itself and a film thickness are strictly managed.

Next, as step 2, initial signal values Xg and Yg of the eddy current sensor 50 are acquired by the monitoring unit 53. Acquiring of the initial signal values Xg and Yg is performed under the same conditions as those in the above-described initial calibration, and performed before the polishing process is started. Specifically, the same or an identical spacer is placed on the polishing table 12, and the same or an identical wafer (i.e., a wafer with no conductive film) is placed on the spacer. In this state, the initial signal values Xg and Yg outputted from the eddy current sensor 50 are acquired. Then, as step 3, initial drifts ΔXg and ΔYg are calculated. Specifically, the characteristic signal values Xc and Yc are subtracted from the initial signal values Xg and Yg, whereby the initial drifts ΔXg (=Xg−Xc) and ΔYg (=Yg−Yc) are obtained.

If a certain period of time has elapsed from the end of the initial calibration (i.e., the hardware calibration) to the start of polishing, the output signals of the eddy current sensor 50 may already be drifted as compared with the output signals thereof right after the initial calibration. The purpose of acquiring the initial signal values Xg and Yg is to determine an amount of a change in the output signals of the eddy current sensor 50 from the time of the initial calibration (hardware calibration). When polishing is started immediately after the initial calibration, the initial drifts ΔXg and ΔYg are estimated to be zero. Therefore, the step 2 and the step 3 are not performed. However, the initial drifts ΔXg and ΔYg may be obtained regardless of whether or not polishing is started right after the initial calibration.

After the step 3 is completed, correction reference values Xb and Yb, which are reference values for correcting the drifts, are acquired by the monitoring unit 53, as step 4. Acquiring of these correction reference values Xb and Yb are performed under conditions similar to those in the initial calibration and the above-described process of acquiring the initial signal values. The similar conditions mean that the conditions are not completely the same as those in the initial calibration and the above-described process of obtaining the initial signal values. More specifically, the correction reference values Xb and Yb are acquired under a condition such that no conductive film is present above the eddy current sensor 50. For example, acquiring of the correction reference values Xb and Yb is performed when the dresser 20 is dressing the polishing surface of the polishing pad 10, or when a wafer is water-polished using water supplied onto the polishing surface and the eddy current sensor 50 does not face a conductive film on the wafer, or when a wafer with no conductive film is water-polished using water supplied onto the polishing surface, or when the polishing pad 10 is removed for replacement from the polishing table 12. Examples of the wafer with no conductive film include a wafer having only a non-conductive film.

When the correction reference values Xb and Yb are to be obtained during dressing, the output values (i.e., the correction reference values Xb and Yb) of the eddy current sensor 50 in a position away from the dresser 20 are acquired. When the correction reference values Xb and Yb are to be obtained during water-polishing of the wafer with a non-conductive film, the output values of the eddy current sensor 50 in a position where it faces the wafer are acquired. To be precise, the output values of the eddy current sensor 50 could change depending on a resistivity of the wafer itself (i.e., a substrate resistance). Therefore, the wafer is managed so that the resistivity thereof lies in a certain range. Instead of the wafer with a non-conductive film, a silicon wafer with no film may be used.

When the correction reference values Xb and Yb are to be obtained during water-polishing of the wafer with the conductive film, the output values of the eddy current sensor 50 in a position away from the wafer are acquired. When the correction reference values Xb and Yb are to be obtained during replacement of the polishing pad 10, the output values of the eddy current sensor 50 are acquired while there is nothing on the polishing table 12. It is noted that acquiring of the correction reference values Xb and Yb during replacement of the polishing pad 10 is limited to a case where liquid permeation into the polishing pad 10 hardly occurs and thus hardly affects the output signals of the eddy current sensor 50.

Processes including water-polishing of the wafer with the non-conductive film are to be performed periodically for quality control (QC). The above-mentioned dressing, the water-polishing, and the replacement of the polishing pad are all necessarily performed in the polishing apparatus. The calibration according to this embodiment is performed during one of these processes without interrupting the process. Therefore, it is not necessary to make time for calibrating the output signals of the eddy current sensor 50. Consequently, a throughput as a whole is not lowered. In any of these processes, the output signals of the eddy current sensor 50 are acquired while the eddy current sensor 50 does not face the conductive film (i.e., while the conductive film is not present within an effective measuring area of the eddy current sensor 50). Therefore, the value of $R_2$ in FIG. 1 approaches infinity, and the correction reference values are obtained under the conditions similar to the conditions when a thickness of the conductive film is reduced to zero.

Next, at step 5, the initial drifts $\Delta Xg$ and $\Delta Yg$ are subtracted from the correction reference values Xb and Yb, so that the correction reference values are corrected. In this step, corrected correction reference values Xo ($=Xb-\Delta Xg$) and Yo ($=Yb-\Delta Yg$) are obtained. Acquiring of the correction reference values Xb and Yb (step 4) and calculation of the corrected correction reference values Xo and Yo (step 5) are performed only once prior to the polishing process. If the correction reference values are obtained immediately after the initial calibration, it is possible to omit acquisition of the characteristic signal values in the step 1, the step 2, the step 3, and the step 5. In this case, Xb and Yb are used as the correction reference values in the subsequent steps.

The processes from the step 2 to the step 5 are for correcting the output signals of the eddy current sensor 50 to the output signals thereof when the initial calibration was performed. However, in a case where the corrected output signals are not required to be identical to the output signals at the time of the initial calibration, it is possible to omit acquisition of the characteristic signal values in the step 1 and the steps 2 to 5 by substituting predetermined values for the correction reference values Xb and Yb, e.g., by letting adjustment target values of the characteristic signal values to Xc' and Yc' and further letting Xo=Xc' and Yo=Yc'. In this case, correcting amounts $\Delta Xa$ and $\Delta Ya$, which will be discussed later, change depending on conditions of obtaining correction signal values Xa and Ya, which will be discussed later. Therefore, in this method, the correction signal values obtained under different conditions cannot be used together. On the other hand, in the previously described method, the correction signal values and the correcting amounts obtained under different conditions (e.g., during dressing, replacement of the polishing pad) can be mixed and used together, as long as the correction reference values are obtained respectively.

Thereafter, as step 6, correction signal values Xa and Ya are acquired by the monitoring unit 53. Acquiring of these correction signal values Xa and Ya is performed under the same conditions as those in acquiring of the correction reference values Xb and Yb. For example, if the correction reference values Xb and Yb were acquired while the dresser 20 was dressing the polishing surface with supply of the dressing liquid, the correction signal values Xa and Ya are also acquired while the dresser 20 is dressing the polishing surface with supply of the same dressing liquid as well. The correction signal values Xa and Ya may be acquired, for example, during dressing before polishing of a wafer, or during replacement of the polishing pad before polishing of a first wafer.

Figure 4:
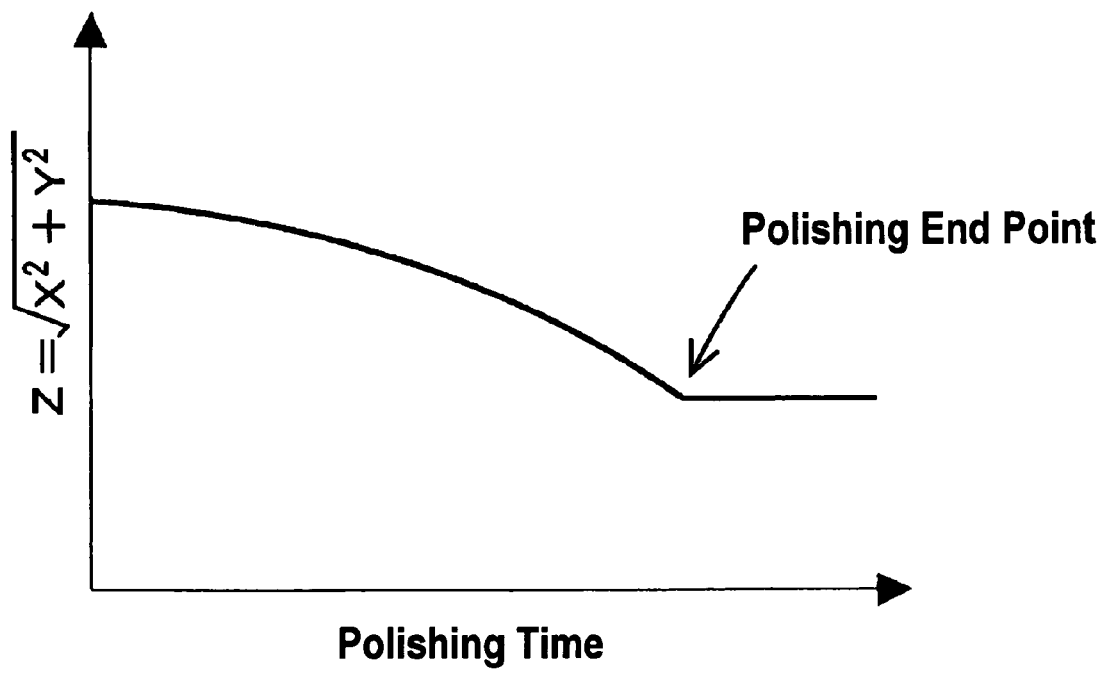
FIG. 4 shows a graph created by plotting a distance Z on a vertical axis and by plotting a polishing time on a horizontal axis.

Then, as step 7, correcting amounts $\Delta Xa$ ($=Xa-Xo$) and $\Delta Ya$ ($=Ya-Yo$) are obtained by subtracting the correction reference values Xo and Yo from the correction signal values Xa and Ya. These correcting amounts $\Delta Xa$ and $\Delta Ya$ are the drifts of the output signals of the eddy current sensor 50. The correcting amounts $\Delta Xa$ and $\Delta Ya$ are stored and registered in the monitoring unit 53. Then, while a subsequent wafer is being polished, corrected output signals Xp and Yp are obtained by subtracting the correcting amounts $\Delta Xa$ and $\Delta Ya$ from the output signals Xm and Ym of the eddy current sensor 50. The corrected output signals Xp ($=Xm-\Delta Xa$) and Yp ($=Ym-\Delta Ya$) are actual measurement signal values. After the initial drifts $\Delta Xg$ and $\Delta Yg$ are calculated in step 3, these initial drifts are registered as initial correcting amounts $\Delta Xa$ and $\Delta Ya$ (i.e., $\Delta Xa=\Delta Xg$, $\Delta Ya=\Delta Yg$). With this initial setting, correction of the output signals of the eddy current sensor 50 can be properly performed even before the correcting amounts are calculated in step 7 at the first time, as long as a long period of time has not elapsed from the calculation of the initial drifts. The monitoring unit 53 calculates a distance $Z (=(Xp^2+Yp^2)^{1/2})$ between the origin O and a point specified by the coordinates (Xp, Yp) on the XY coordinate system, as shown in FIG. 4. Further, the monitoring unit 53 monitors a thickness of the conductive film during polishing based on a change in the distance Z.

A polishing end point can be detected by detecting a singular point where the distance Z becomes constant. Further, by obtaining beforehand data showing a relationship between the distance Z and the film thickness from experiences or experiments, it is possible to stop polishing or change polishing conditions when the film thickness is reduced to a desired film thickness.

The correcting amounts $\Delta Xa$ and $\Delta Ya$ are compared with predetermined thresholds by the monitoring unit 53 every time the correcting amounts are calculated (step 8). If the correcting amounts calculated are equal to or less than the thresholds, the currently registered correcting amounts are replaced with newly calculated correcting amounts (step 9). On the other hand, if the correcting amounts calculated exceed the thresholds, those correcting amounts calculated are discarded as unexpected things occur.

Subsequently, the steps 6 to 9 are repeated at a certain interval, so that the registered correcting amounts are kept at proper values. If the effect of the liquid permeation into the polishing pad 10 is large, the steps 6 to 9 may be repeated every time a wafer is polished or every time wafers in one lot are polished. If the effect of the liquid permeation into the polishing pad 10 is small, the steps 6 to 9 may be repeated every time the polishing pad 10 is replaced.

Figure 17A:
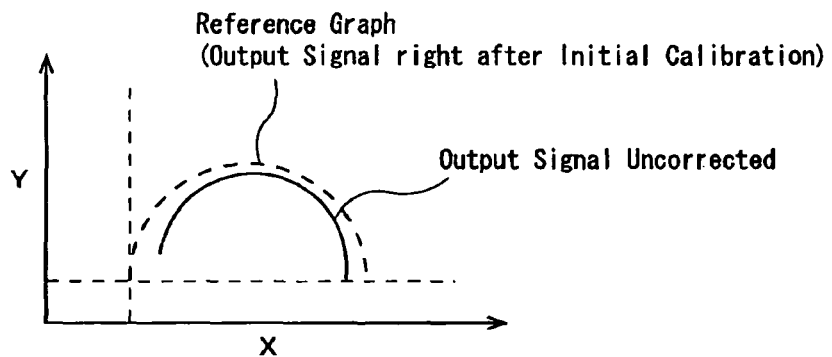
FIGS. 17A through 17D are views illustrating processes of performing drift correction, rotation correction, and gain correction.
Figure 17B:
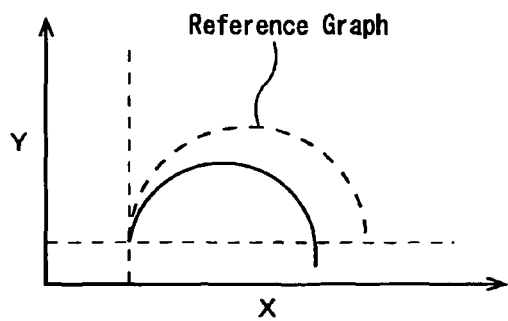
Figure 17C:
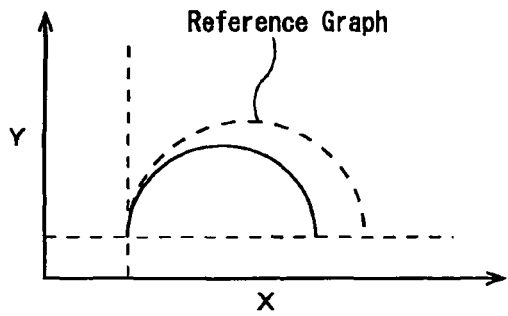
Figure 17D:
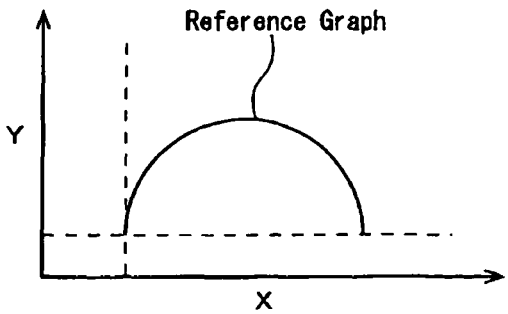

As shown in FIG. 17A, an arc-shaped graph showing the output signals of the eddy current sensor 50 may rotate, expand, or shrink, in addition to drift. In such a case, rotation correction and/or gain correction may be performed, in addition to the drift correction. The rotation correction and the gain correction can be performed as follows. First, the output signals of the eddy current sensor are acquired right after the initial calibration (hardware calibration), so that a reference graph is created (see a dotted line in FIG. 17A). Then, the previously-described calibration is performed to correct the drift (see FIG. 17B). Subsequently, the rotation correction is performed (see FIG. 17C) and the gain correction is further performed so that a graph as an object of correction conforms to the reference graph. These corrections allow accurate monitoring of the film thickness.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims and equivalents.

What is claimed is:

1. A method of monitoring a change in thickness of a conductive film on a substrate brought into sliding contact with a polishing surface of a polishing pad using an eddy current sensor, said method comprising:

acquiring an output signal of the eddy current sensor as a correction signal value during water-polishing of a substrate, during dressing of the polishing pad, or during replacement of the polishing pad;

acquiring a characteristic signal value of the eddy current sensor;

acquiring an output signal of the eddy current sensor as an initial signal value under the same conditions as those when the characteristic signal value is acquired;

calculating an initial drift from a difference between the characteristic signal value and the initial signal value;

correcting a predetermined correction reference value by subtracting the initial drift from the predetermined correction reference value to obtain a corrected correction reference value, the predetermined correction reference value comprising the output signal of the eddy current sensor obtained in advance under the same conditions as those when the correction signal value is acquired;

calculating a correcting amount from a difference between the correction signal value and the corrected correction reference value;

calculating an actual measurement signal value by subtracting the correcting amount from the output signal of the eddy current sensor when polishing a substrate having a conductive film; and monitoring a change in thickness of the conductive film during polishing by monitoring a change in the actual measurement signal value.

2. The method according to claim 1, wherein the output signal of the eddy current sensor comprises a resistance component and an inductive reactance component of an impedance of an electric circuit including a coil of the eddy current sensor.

3. A method of monitoring a change in thickness of a conductive film on a substrate brought into sliding contact with a polishing surface of a polishing pad using an eddy current sensor, said method comprising:

acquiring an output signal of the eddy current sensor as a correction signal value during water-polishing of a substrate, during dressing of the polishing pad, or during replacement of the polishing pad;

calculating a correcting amount from a difference between the correction signal value and a predetermined correction reference value;

calculating an actual measurement signal value by subtracting the correcting amount from the output signal of the eddy current sensor when polishing a substrate having a conductive film; and monitoring a change in thickness of the conductive film during polishing by monitoring a change in the actual measurement signal value, wherein:

the output signal of the eddy current sensor comprises a resistance component and an inductive reactance component of an impedance of an electric circuit including a coil of the eddy current sensor;

the resistance component and the inductive reactance component are defined as coordinates on a coordinate system; and the coordinates are rotated and moved on the coordinate system such that a distance between an origin of the coordinate system and a point specified by the coordinates decreases in accordance with a decrease in the thickness of the conductive film.

4. An apparatus for polishing a substrate, said apparatus comprising:

a polishing pad having a polishing surface;

an eddy current sensor;

a top ring configured to press a substrate against said polishing surface;

a dresser configured to dress said polishing surface;

a mechanism configured to provide relative motion between the substrate and said polishing pad; and a monitoring unit configured to monitor a change in thickness of a conductive film on a substrate brought into sliding contact with said polishing surface using said eddy current sensor, wherein said monitoring unit is operable to acquire an output signal of said eddy current sensor as a correction signal value during water-polishing of a substrate, during dressing of said polishing pad, or during replacement of said polishing pad, calculate a correcting amount from a difference between the correction signal value and a predetermined correction reference value, calculate an actual measurement signal value by subtracting the correcting amount from the output signal of said eddy current sensor when polishing a substrate having a conductive film, and monitor a change in thickness of the conductive film during polishing by monitoring a change in the actual measurement signal value, and wherein:

the output signal of said eddy current sensor comprises a resistance component and an inductive reactance component of an impedance of an electric circuit including a coil of said eddy current sensor;

the resistance component and the inductive reactance component are defined as coordinates on a coordinate system; and the coordinates are rotated and moved on the coordinate system such that a distance between an origin of the coordinate system and a point specified by the coordinates decreases in accordance with a decrease in the thickness of the conductive film.

5. The apparatus according to claim 4, wherein the predetermined correction reference value comprises the output signal of said eddy current sensor obtained in advance under the same conditions as those when the correction signal value is acquired.

* * * * *